United States Patent Office 2,884,419
Patented Apr. 28, 1959

2,884,419

CHEMICAL COMPOUNDS AND PROCESSES FOR PREPARING THE SAME

Lewis H. Sarett, Princeton, N.J., assignor to Merck & Co., Inc., Rahway, N.J., a corporation of New Jersey No Drawing. Application September 19, 1955
Serial No. 535,276

26 Claims. (Cl. 260—239.55)

This invention relates to novel steroid and dodecahydrophenanthrene compounds and processes of preparing the same. More particularly, it is concerned with the preparation of new androstadiene compounds having functional substituents at positions 1, 4 and 7, and an unsaturated aliphatic substituent at position 2, novel dodecahydrophenanthrene compounds useful in the preparation of said androstadiene compounds, and processes of preparing the same.

This application is a continuation-in-part of my copending application, Serial No. 307,370, filed August 30, 1952, now abandoned.

Since the elucidation of the structure of steroid compounds, many investigators have unsuccessfully sought a method of preparing steroids by total synthesis. More recently, the discovery of the therapeutic activity of cortisone and similar related compounds has stimulated further efforts to find a method of preparing these important compounds by total synthesis.

It is an object of my present invention to provide a process for the preparation of novel steroid compounds by total synthesis, utilizing 2,4b-dimethyl-dodecahydrophenanthrene compounds having functional substituents in positions 1, 4 and 7, and an unsaturated aliphatic hydrocarbon substituent in the 2-position as the starting materials. Another object is to provide novel intermediate dodecahydrophenanthrene compounds useful in the preparation of my new androstadiene compounds and other steroid compounds, and processes of obtaining the same. Other objects will be apparent from the detailed description of my invention hereinafter provided.

In accordance with my invention, I have now found that 16-keto-androstadiene compounds can be prepared from 2,4b-dimethyl-2-methallyl-7-ethylenedioxy-1,2,3,4a,4b,5,6,7,8,10,10a-dodecahydrophenanthrene-1,4-dione, or the corresponding 4-ol-1-one compound, by processes which may be shown as follows:

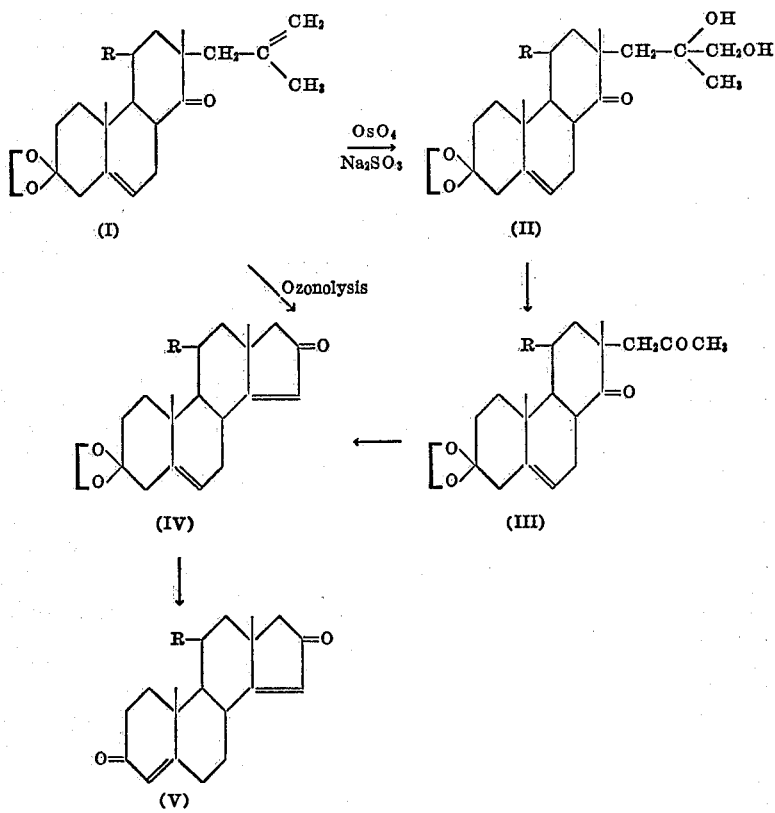

wherein R is a member from the group consisting of hydroxyl and keto.

In this process, the 2-methallyl substituted dodecahydrophenanthrene (I) is first hydroxylated to form the corresponding 2-β,γ-dihydroxy compound (II) which is dehydroxylated to form the 2-(acetonyl) compound (III). Alternatively, as indicated by the flow sheet, the 2-methallyl-dodecahydrophenanthrene compound can be ozonized and the resulting ozonized product decomposed to form the 2-(acetonyl) compound. This latter compound is then treated to effect ring closure and form the desired 16-keto-androstadiene compound (IV). The androstadiene compound having the 3-ethylenedioxy substituent can then be hydrolyzed by treatment with acid to remove the ethylenedioxy group and form the 3-keto-androstadiene compound (V).

As will be readily apparent to those skilled in the art, the reactions indicated on the foregoing flow sheet may be carried out with similar compounds wherein the 7-keto substituent is blocked or protected by the formation of a suitable derivative such as enol ether, cyclic ether, or another ketal, which can be readily removed by hydrolysis to obtain the 3-keto compound. Generally, however, I find that it is advantageous to employ a ketal, preferably a cyclic ketal, such as the ethylenedioxy derivative in my process. As shown in the flow sheet, the double bond in compounds having the 7-ketal substituent is believed to be in the 8a-9-position in the dodecahydrophenanthrene compound or in the 5,6-position in the steroid compound. Upon hydrolysis with acid and regeneration of the keto group, the double bond shifts to the 8,8a-position in the dodecahydrophenanthrene compounds, and to the 4,5-position in the steroid compounds.

In accordance with one embodiment of the present invention, I have found that the starting materials, namely, 2,4b-dimethyl-2-methallyl-7-ethylenedioxy-1,2,3,4,4a,4b,5, 6,7,8,10,10a-dodecahydrophenanthrene-1,4-dione or the corresponding 4-ol-1-one compound, are readily hydroxylated by reaction with osmium tetroxide followed by hydrolysis of the resulting osmate ester to obtain the corresponding glycol derivative. This process is conveniently carried out by adding osmium tetroxide to a solution of the methallyl compound in an inert solvent such as ether, benzene, mixtures of benzene and tetrahydrofuran, and the like. The reaction mixture is allowed to stand at room temperature for about 5-12 hours and the osmate ester formed is then hydrolyzed with an aqueous solution of a reducing agent such as sodium sulfite or ascorbic acid. This hydrolysis is preferably carried out by adding alcohol and an aqueous solution of the reducing agent to the solution containing the osmate ester and refluxing the resulting mixture for about 1-4 hours. After removing the precipitated inorganic salts and concentrating the resulting solution, the desired $\beta,\gamma$-dihydroxy-isobutyl compound can then be isolated by conventional procedures such as chromatography or recrystallization from suitable solvents.

Alternatively, as indicated above, the 2-(acetonyl) compounds can also be prepared by reacting 2,4b-dimethyl-2-methallyl-7-ethylenedioxy-1,2,3,4,4a,4b,5,6,7,8,10,10a-dodecahydrophenanthrene-1,4-dione or the corresponding 4-ol-1-one compound, with ozone, and reducing the resulting ozonized product. In carrying out this process I prefer to effect the ozonization by passing a stream of ozonized oxygen through a solution of the starting material in a suitable solvent such as a mixture of methyl alcohol and ethyl acetate at a temperature of about $-75°$ C. until one equivalent of ozone has been added. The resulting ozonized reaction product is then decomposed at $-20°$ C. by the addition of zinc dust and dilute acetic acid. After removing the zinc from the resulting reaction product, the solution is concentrated under diminished pressure to about ½ of its original volume. This concentrated solution is then extracted with ether and the desired product recovered by concentration of the ether extracts. Alternatively, the ozonized product can be reduced by other methods such as catalytic hydrogenation in the presence of palladium catalyst to obtain the desired acetonyl compound.

It is indeed surprising and unexpected that in the process of treating 2,4b-dimethyl-2-methallyl-7-ethylene-dioxy-1,2,3,4,4a,4b,5,6,7,8,10,10a - dodecahydrophenanthrene-1,4-dione or the corresponding 4-ol-1-one compound with reagents such as ozone and osmium tetroxide, that the double bond in the 8a,9-position is not simultaneously attacked along with the unsaturated double bond in the side chain. It might have been anticipated that the ring double bond would also be attacked under the reaction conditions.

Pursuant to a further embodiment of my invention, I have found that the ring closure of the 2,4b-dimethyl-2-(acetonyl)-7-ethylenedioxy - 1,2,3,4,4a,4b,5,6,7,8,10,10a-dodecahydrophenanthrene-1,4-dione, or the corresponding 4-ol-1-one compound, to the corresponding $\Delta^{5,14}$-3-ethylenedioxy-11-hydroxy-16-keto androstadiene or the corresponding 11,16-diketo compound, is conveniently effected by heating an aqueous suspension of the dodecahydrophenanthrene compound with an alkali in the absence of oxygen. Generally, I prefer to effect this ring closure by heating the suspension of the acetonyl compound in dilute aqueous alkali metal hydroxide solution, although aqueous solutions of other alkali such as sodium carbonate, potassium carbonate, calcium hydroxide, magnesium hydroxide and the like can also be used for this purpose. Thus, this reaction is preferably carried out by heating a suspension of the 2-(acetonyl)-dodecahydrophenanthrene compound in a 2.5% aqueous solution of potassium hydroxide under diminished presure for about 20 hours. The androstadiene compound is readily recovered by extracting the resulting reaction mixture with ether and concentrating the ether extracts to dryness. The product so obtained can be further purified by chromatography or crystallization from alcohol.

The $\Delta^{5,14}$-3-ethylenedioxy-11,16 - diketo-androstadiene and the $\Delta^{5,14}$-3-ethylenedioxy-11-hydroxy-16-ketoandrostadiene upon hydrolysis under acid conditions are cleaved to form the corresponding 3-keto-androstadiene compounds.

The novel dodecahydrophenanthrene compounds prepared in accordance with my present invention are valuable in the field of pharmaceuticals and are useful in the preparation of important steroidal compounds. Thus, the dodecahydrophenanthrene compounds having a 2-acetonyl substituent can be treated to effect ring closure; the acetonyl radical providing the carbon atoms for the fourth ring, ring D, of the steroid molecule. For example, as shown herein, these dodecahydrophenanthrene compounds can be converted to androstadienes. Similarly, the dodecahydrophenanthrene compounds can be used in the preparation of other valuable steroid compounds. The androstadienes can also be used in the preparation of other valuable steroids.

Thus, for example, $\Delta^{5,14}$-3-ethylenedioxy-11,16-diketo-androstadiene, prepared in accordance with the present invention, can be converted to andrenosterone, a valuable compound having androgenic activity by the following process:

Upon dissolving $\Delta^{5,14}$-3-ethylenedioxy-11,16-androstadiene in a solution of potassium in dry butyl alcohol and adding n-butyl nitrite, $\Delta^{5,14}$-3-ethylenedioxy-androstadiene-11,16,17-trione-17-oxime is produced and can be recovered by acidifying the reaction mixture, extraction with ether and evaporation of the ether extract. Reaction of this oxime with p-toluene-sulfonyl chloride and dilute potassium hydroxide followed by careful acidification with monosodium phosphate affords the anhydride of 2,4b-dimethyl-7-ethylenedioxy-1-carboxymethylene - 2 - carboxy-1,2,3,4,4a,4b,5,6,7,8,10,10a - dodecahydrophenanthrene-4-one. Reduction of the latter compound with sodium amalgam and esterification of the resulting acid with diazomethane affords 2,4b-dimethyl-7-ethylenedioxy-1-carbomethoxy-methyl-2-carbomethoxy-1,2,3,4,4a,4b,5,6,7,8,-10,10a-dodecahydrophenanthrene-4-one, which upon careful hydrolysis with sodium hydroxide is converted to 2,4b-dimethyl-7-ethylenedioxy-1-carboxymethyl-2 - carbomethoxy - 1,2,3,4,4a,4b,5,6,7,8,10,10a - dodecahydrophenanthrene-4-one. Upon reacting this compound with thionyl chloride the corresponding acid chloride is obtained. Reaction of the acid chloride with diazomethane and treatment of the resulting product with methanol and silver hydroxide results in the production of 2,4b-dimethyl-7-ethylenedioxy-1($\beta$-carbomethoxy-ethyl)-2-carbomethoxy-1,2,3,4,4a,4b,5,6,7,8,10,10a - dodecahydrophenanthrene-4-one. Treatment of this compound with sodium methylate in methanol yields 3-ethylenedioxy-16-carbomethoxy-$\Delta^5$-androstene-11,17-dione which upon heating with methanolic HCl yields $\Delta^4$-3,11,17-triketo-androstene or adrenosterone.

The following examples illustrate embodiments of my invention.

EXAMPLE 1

*Preparation of 2,4b-dimethyl-2-(β,γ-dihydroxy-isobutyl)-7-ethylenedioxy-1,2,3,4,4a,4b,5,6,7,8,10,10a-dodecahydrophenanthrene-1,4-dione*

To a solution of 2.0 g. of 2,4b-dimethyl-2-methallyl-7-ethylenedioxy - 1,2,3,4,4a,4b,5,6,7,8,10,10a - dodecahydrophenanthrene-1,4-dione, which may be prepared as described in copending application Serial No. 445,921, filed July 26, 1954, in absolute ether was added 1.6 g. of osmium tetroxide. The solution was allowed to stand overnight, then treated with 90 cc. of alcohol, 10 cc. of benzene and a solution of 4.0 g. of sodium sulfite in 60 cc. of water. The mixture was refluxed for one hour, filtered from inorganic salts, concentrated to a small volume and extracted with ether. The ethereal solution was evaporated and gave crystals of 2,4b-dimethyl-2-(β,γ - dihydroxy - isobutyl) - 7 - ethylenedioxy - 1,2,3,4,4a,4b,5,6,7,8,10,10a - dodecahydrophenanthrene - 1,4-dione, M.P. 179–181° C.

Upon hydrolyzing this product with acid the ethylenedioxy substituent is cleaved to form the corresponding 7-keto compound, 2,4b-dimethyl-2-(β,γ-dihydroxyisobutyl) - 1,2,3,4,4a,4b,5,6,7,9,10,10a - dodecahydrophenanthrene-1,4,7-trione.

EXAMPLE 2

*Preparation of 2,4b-dimethyl-2-(β,γ-dihydroxy-isobutyl)-7-ethylenedioxy-1,2,3,4,4a,4b,5,6,7,8,10,10a-dodecahydrophenanthrene-4-ol-1-one*

A solution of 1.3 g. of 2,4b-dimethyl-2-methallyl-7-ethylenedioxy - 1,2,3,4,4a,4b,5,6,7,8,10,10a - dodecahydrophenanthrene-4-ol-one, which may be prepared as described in copending application Serial No. 445,921, filed July 26, 1954, in a mixture of 10 cc. of benzene and 3 cc. of tetrahydrofuran was treated with 1.05 g. of osmium tetroxide. After standing at room temperature for five hours the mixture was diluted with 60 cc. of ethanol and a solution of 3.0 g. of sodium sulfite in 40 cc. of water. The mixture was then refluxed for four hours, filtered to remove inorganic salts, concentrated to a small volume and extracted with chloroform. The chloroform was concentrated to dryness to give amorphous 2,4b - dimethyl - 2 - (β,γ - dihydroxy-isobutyl)-7-ethylenedioxy - 1,2,3,4,4a,4b,5,6,7,8,10,10a - dodecahydrophenanthrene-4-ol-1-one.

Upon hydrolyzing this product with acid the ethylenedioxy substituent is cleaved to form the corresponding 7-keto compound, 2,4b - dimethyl - 2 - (β,γ - dihydroxyisobutyl) - 1,2,3,4,4a,4b,5,6,7,9,10,10a - dodecahydrophenanthrene-4-ol-1,7-dione.

EXAMPLE 3

*Preparation of 2,4b-dimethyl-2-(acetonyl)-7-ethylenedioxy - 1,2,3,4,4a,4b,5,6,7,8,10,10a - dodecahydrophenanthrene-4-ol-1-one*

1.0 g. of 2,4b-dimethyl-2-methallyl-7-ethylenedioxy-1,2,3,4,4a,4b,5,6,7,8,10,10a - dodecahydrophenanthrene-4-ol-1-one was dissolved in 75 ml. of methyl alcohol and 85 ml. of ethyl acetate. Through this solution, cooled to −75° C., was passed a stream of ozonized oxygen containing one equivalent of ozone. The ozonide produced was decomposed at −20° C. by the addition of 5 g. of zinc dust and 100 cc. of 5% aqueous acetic acid. The zinc was then filtered off and the solution concentrated in vacuo to one half its original volume. This solution was then extracted with ether, the extract washed with potassium carbonate, dried and concentrated to dryness.

The crude crystalline residue was purified by chromatography over alumina. The 2,4b-dimethyl-2-(acetonyl)-7 - ethylenedioxy - 1,2,3,4,4a,4b,5,6,7,8,10,10a - dodecahydrophenanthrene-4-ol-1-one, after elution with a petroleum ether-ether mixture, and recrystallization from ethyl alcohol, melted at 195–198° C.

Upon hydrolyzing this product with acid the ethylenedioxy substituent is cleaved to form the corresponding 7-keto compound, 2,4b-dimethyl-2-(acetonyl)-1,2,3,4,4a,4b,5,6,7,9,10,10a - dodecahydrophenanthrene - 4 - ol-1,7-dione.

EXAMPLE 4

*Preparation of 2,4b - dimethyl - 2 - (acetonyl) - 7-ethylenedioxy-1,2,3,4,4a,4b,5,6,7,8,10,10a - dodecahydrophenanthrene-1,4-dione*

A solution of 2.05 g. of 2,4b-dimethyl-2-(β,γ-dihydroxy - isobutyl) - 7 - ethylenedioxy - 1,2,3,4,4a,4b,5,6,7,8,10,10a - dodecahydrophenanthrene - 1,4 - dione in 6 cc. of methanol and 2 cc. of pyridine was treated with a solution of 1.5 g. of periodic acid in 6 cc. of water. After 8 minutes the solution was concentrated in vacuo, diluted with water and the crystalline product filtered. After recrystallization from alcohol the product 2,4b-dimethyl-2 - (acetonyl) - 7 - ethylenedioxy - 1,2,3,4,4a,4b,5,6,7,8,10,10a - dodecahydrophenanthrene - 1,4 - dione was filtered. On recrystallization from alcohol the product melted at 166° C.

Upon hydrolysis of this product with acid the 7-ethylenedioxy substituent is cleaved to form the corresponding 7-keto compound, 2,4b-dimethyl-2-(acetonyl)-1,2,3,4,4a,4b,5,6,7,9,10,10a - dodecahydrophenanthrene - 1,4,7-trione.

EXAMPLE 5

*Preparation of 2,4b-dimethyl-2-(acetonyl)-7-ethylenedioxy-1,2,3,4,4a,4b,5,6,7,8,10,10a - dodecahydrophenanthrene-4-ol-1-one*

A solution of 1.45 g. of 2,4b-dimethyl-2-(β,γ-dihydroxy - isobutyl) - 7 - ethylenedioxy-1,2,3,4,4a,4b,5,6,7,8,10,10a - dodecahydrophenanthrene-4-ol-1-one in 6 cc. of methanol and 2 cc. of pyridine was treated with a solution of 1.5 g. of periodic acid in 6 cc. of water. After 8 minutes the solution was concentrated in vacuo, diluted with water and the crystalline product filtered. After recrystallization from alcohol the product 2,4b-dimethyl - 2 - (acetonyl) - 7 - ethylenedioxy - 1,2,3,4,4a,4b,5,6,7,8,10,10a - dodecahydrophenanthrene - 4 - ol - 1-one, melted at 195–198° C.

EXAMPLE 6

*Preparation of $\Delta^{5,14}$-3-ethylenedioxy-11,16-diketo-androstadiene*

A suspension of 400 mg. of 2,4b-dimethyl-2-(acetonyl) - 7 - ethylenedioxy - 1,2,3,4,4a,4b,5,6,7,8,10,10a-dodecahydrophenanthrene-1,4-dione in 40 cc. of 2.5% solution of potassium hydroxide in water, in a sealed evacuated container, was heated to 80–90° C. for 1¾ hours. The mixture was then extracted with ether and the ethereal layer evaporated to dryness. The resulting residue containing $\Delta^{5,14}$-3-ethylenedioxy-11,16-diketoandrostadiene was purified by chromatography over alumina using a petroleum ether-ether mixture to elute the product which was found to melt at 155° C.

Upon hydrolysis with acid the ethylenedioxy substituent of $\Delta^{5,14}$-3-ethylenedioxy-11,16-diketo-androstadiene is cleaved to form $\Delta^{4,14}$-3,11,16-triketo-androstadiene.

EXAMPLE 7

*Preparation of $\Delta^{5,14}$-3-ethylenedioxy-11-hydroxy-16-keto-androstadiene*

A suspension of 325 mg. of 2,4b-dimethyl-2-(acetonyl)-7 - ethylenedioxy - 1,2,3,4,4a,4b,5,6,7,8,10,10a - dodecahydrophenanthrene-4-ol-1-one in 30 cc. of 2.5% aqueous potassium hydroxide was heated in vacuo on the steam-bath for 20 hours. The mixture was then extracted with ether and the ethereal solution concentrated to dryness. The crude $\Delta^{5,14}$-3-ethylenedioxy-11-hydroxy-16-keto-androstadiene was purified by chromatography on alumina, elution with petroleum ether-ether, and crystallization from alcohol. It melts at 230–236° C.

EXAMPLE 8

*Preparation of $\Delta^{4,14}$-androstadiene-11β-ol-3,16-dione (II)*

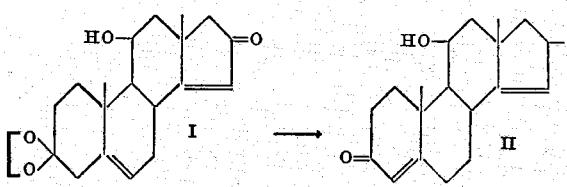

A suspension of 5.5 mg. of 3-ethylenedioxy-$\Delta^{5,14}$-androstadiene-11β-ol-16-one (I) in 1 ml. of acetone was treated with 2 mg. of p-toluene sulfonic acid and warmed briefly until the reactants dissolved. The reaction mixture was kept at room temperature for four hours and then was concentrated to a volume of 0.5 ml. One-half milliliter of water was added and the acetone was evaporated in a stream of nitrogen. The resulting pure crystalline $\Delta^{4,14}$-androstadiene-11β-ol-3,16-dione (II) was collected, washed thoroughly with water and dried; 4.8 mg., M.P. 236–238° C., $\lambda_{max.}^{MeOH}$ 238 mμ, ε mol 31,200

On admixture with the starting ketone II (M.P. 235–239° C.) the melting point was lowered to 208–230° C.

Various changes and modifications may be made in carrying out the present invention without departing from the spirit and scope thereof. Insofar as these changes and modifications are within the purview of the annexed claims, they are to be construed as part of my invention.

I claim:

1. The process which comprises reacting a dodecahydrophenanthrene compound of the formula:

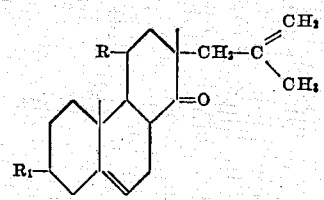

wherein R is a substituent from the group consisting of keto and hydroxyl, and $R_1$ is a group convertible to keto by hydrolysis, with osmium tetroxide, and treating the resulting osmate ester with a reducing agent to form a compound of the formula:

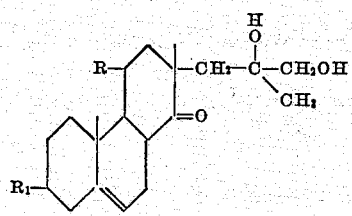

wherein R and $R_1$ are the same as defined above.

2. The process which comprises reacting 2,4b-dimethyl-2 - methallyl - 7 - ethylenedioxy - 1,2,3,4,4a,4b,5,6,7,8,10,10a-dodecahydrophenanthrene-1,4-dione having the structural formula:

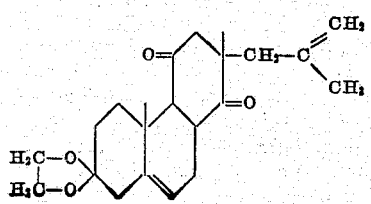

with osmium tetroxide, and intimately contacting the resulting reaction product with an aqueous solution of sodium sulfite to form 2,4b-dimethyl-2-(β,γ-dihydroxy-isobutyl) - 7 - ethylenedioxy - 1,2,3,4,4a,4b,5,6,7,8,10,10a-dodecahydrophenanthrene-1,4-dione having the structural formula:

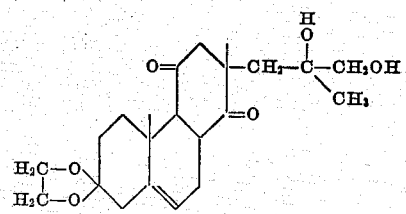

3. The process which comprises reacting 2,4b-dimethyl-2 - methallyl - 7 ethylenedioxy - 1,2,3,4,4a,4b,5,6,7,8,10,10a-dodecahydrophenanthrene-4-ol-1-one having the structural formula:

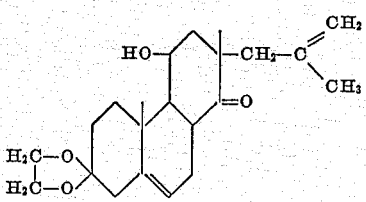

with osmium tetroxide, and intimately contacting the resulting reaction product with an aqueous solution of sodium sulfite to form 2,4b-dimethyl-2-(β,γ-dihydroxy-isobutyl) - 7 - ethylenedioxy - 1,2,3,4,4a,4b,5,6,7,8,10,10a-dodecahydrophenanthrene-4-ol-1-one having the structural formula:

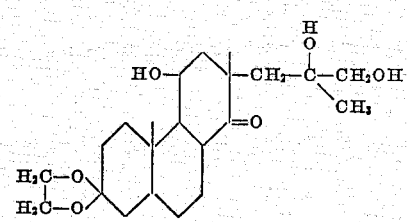

4. A dodecahydrophenanthrene compound of the formula:

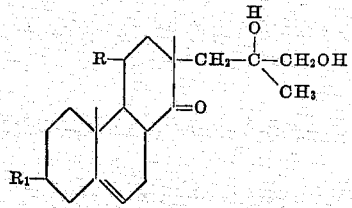

wherein R is a substituent from the group consisting of hydroxyl and keto, and $R_1$ is a substituent convertible to keto by hydrolysis.

5. 2,4b - dimethyl - 2 - (β,γ - dihydroxy - isobutyl) - 7-ethylenedioxy - 1,2,3,4,4a,4b,5,6,7,8,10,10a - dodecahydrophenanthrene-1,4-dione having the structural formula:

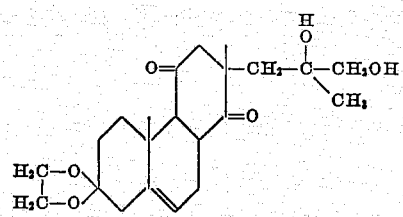

6. 2,4b - dimethyl - 2 - (β,γ - dihydroxy - isobutyl) - 7-ethylenedioxy - 1,2,3,4,4a,4b,5,6,7,8,10,10a - dodecahydrophenanthrene-4-ol-1-one having the structural formula:

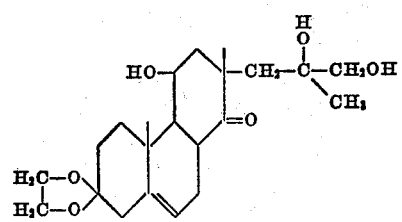

7. A dodecahydrophenanthrene compound of the formula:

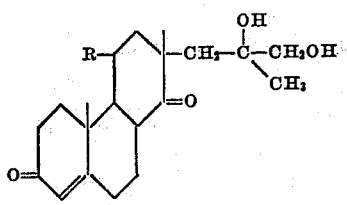

wherein R is a member from the group consisting of keto and hydroxyl.

8. 2,4b - dimethyl - 2 - ($\beta,\gamma$ - dihydroxy - isobutyl)-1,2,3,4,4a,4b,5,6,7,9,10,10a - dodecahydrophenanthrene-4-ol-1,7-dione having the structural formula:

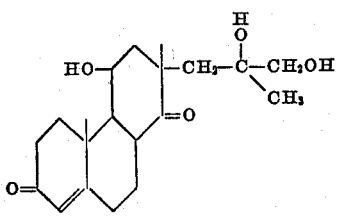

9. 2,4b - dimethyl - 2 - ($\beta,\gamma$ - dihydroxy - isobutyl)-1,2,3,4,4a,4b,5,6,7,9,10,10a - dodecahydrophenanthrene-1,4,7-trione having the structural formula:

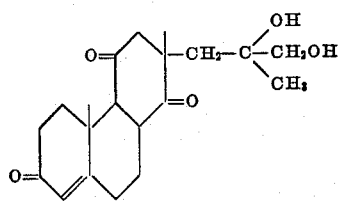

10. The process which comprises reacting a dodecahydrophenanthrene compound of the formula:

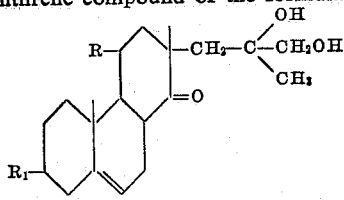

wherein R is a member from the group consisting of hydroxyl and keto and $R_1$ is a substituent convertible to keto by hydrolysis, with a glycol splitting agent to form a compound of the formula:

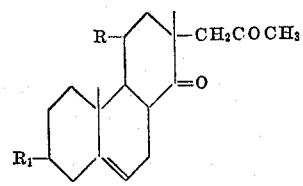

wherein R and $R_1$ are the same as defined above.

11. The process which comprises reacting a dodecahydrophenanthrene compound of the formula:

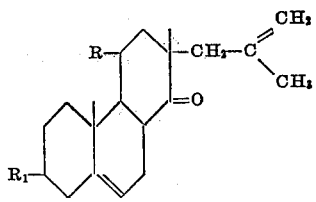

with ozone, and intimately contacting the resulting ozonized product with a reducing agent to form a compound of the formula:

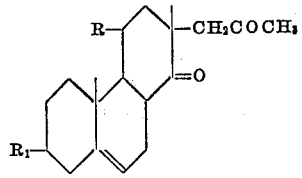

wherein R and $R_1$ are the same as defined above.

12. A dodecahydrophenanthrene compound of the formula:

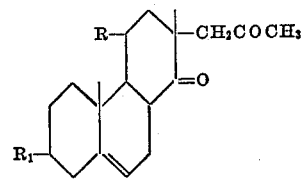

wherein R is a member from the group consisting of hydroxyl and keto, and $R_1$ is a substituent convertible to keto by hydrolysis.

13. 2,4b - dimethyl - 2 - (acetonyl) - 7 - ethylenedioxy-1,2,3,4,4a,4b,5,6,7,8,10,10a - dodecahydrophenanthrene-1,4-dione having the structural formula:

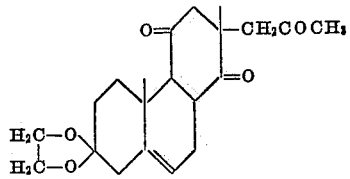

14. 2,4b - dimethyl - 2 - (acetonyl) - 7 - ethylenedioxy-1,2,3,4,4a,4b,5,6,7,8,10,10a - dodecahydrophenanthrene-4-ol-1-one having the structural formula:

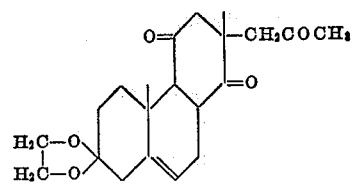

15. A dodecahydrophenanthrene compound of the formula:

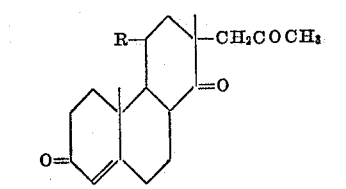

wherein R is a member from the group consisting of keto and hydroxyl.

16. 2,4b - dimethyl - 2 - (acetonyl) - 1,2,3,4,4a,4b,5,6, 7,9,10,10a - dodecahydrophenanthrene - 1,4,7 - trione having the structural formula:

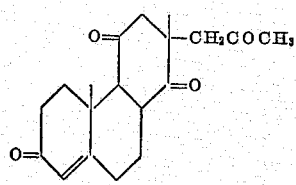

17. 2,4b - dimethyl - 2 - (acetonyl) - 1,2,3,4,4a,4b,5,6,7,9,10,10a - dodecahydrophenanthrene - 4 - ol - 1,7 - dione having the structural formula:

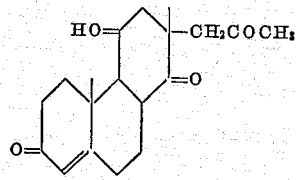

18. The process which comprises reacting a dodecahydrophenanthrene compound of the formula:

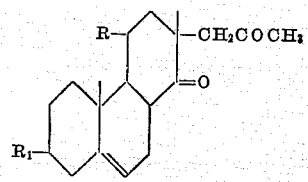

wherein R is a member from the group consisting of hydroxyl and keto and $R_1$ is a substituent convertible to keto by hydrolysis, with an aqueous solution of an alkali metal hydroxide to form a compound of the formula:

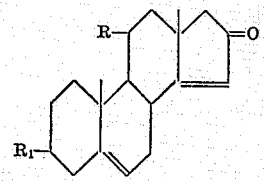

wherein R and $R_1$ are the same as defined above.

19. The process which comprises reacting 2,4b-dimethyl - 2 - (acetonyl) - 7 - ethylenedioxy - 1,2,3,4,4a,4b,5,6,7,8,10,10a - dodecahydrophenanthrene - 1,4 - dione having the structural formula:

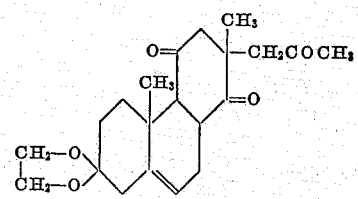

with an aqueous solution of an alkali metal hydroxide to form $\Delta^{5,14}$-3-ethylenedioxy-11,16-diketo-androstadiene having the structural formula:

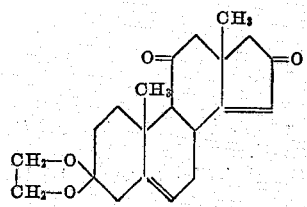

20. The process which comprises reacting 2,4b-dimethyl - 2 - (acetonyl) - 7 - ethylenedioxy - 1,2,3,4,4a,4b,5,6,7,8,10,10a-dodecahydrophenanthrene-4-ol-1-one having the structural formula:

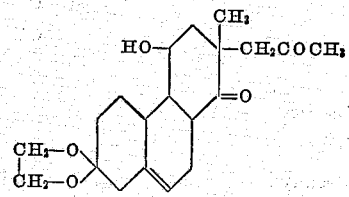

with an aqueous solution of an alkali metal hydroxide to form $\Delta^{5,14}$-3-ethylenedioxy-11-hydroxy-16-keto-androstadiene having the structural formula:

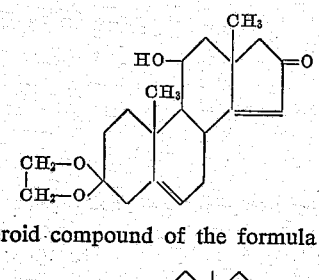

21. A steroid compound of the formula:

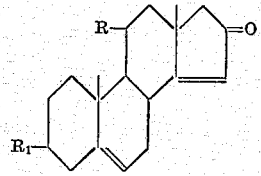

wherein R is a member from the group consisting of hydroxyl and keto, and $R_1$ is a substituent convertible to keto by hydrolysis.

22. $\Delta^{5,14}$-3-ethylenedioxy-11,16-diketo androstadiene having the structural formula:

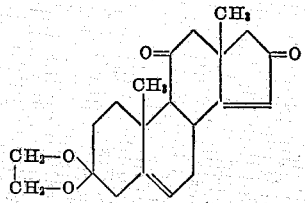

23. $\Delta^{5,14}$ - 3 - ethylenedioxy - 11 - hydroxy - 16 - keto-androstadiene having the structural formula:

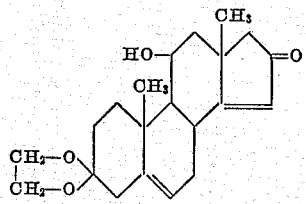

24. A steroid compound of the formula:

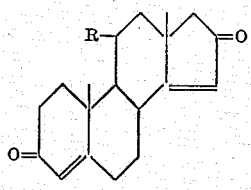

wherein R is a member from the group consisting of keto and hydroxyl.

25. $\Delta^{4,14}$ - 3,11,16 - triketo - androstadiene having the structural formula:
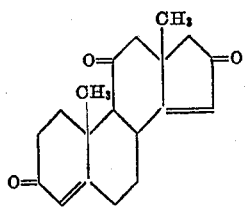
26. $\Delta^{4,14}$-11-hydroxy-3,16-diketo-androstadiene having the structural formula:
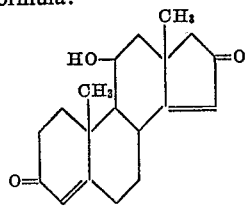
No references cited.